(12) United States Patent
Pysall et al.

(10) Patent No.: US 6,555,629 B1
(45) Date of Patent: Apr. 29, 2003

(54) METHOD AND DEVICE FOR CONTINUOUS PRODUCTION OF POLYMERS

(75) Inventors: Detlev Pysall, Dreieich (DE); Olaf Wachsen, Garching (DE); Thomas Bayer, Bad Soden (DE); Stefan Wulf, Mönchengladbach (DE)

(73) Assignee: Siemens Axiva GmbH & Co. KG (DE)

( * ) Notice: Subject to any disclaimer, the term of this patent is extended or adjusted under 35 U.S.C. 154(b) by 0 days.

(21) Appl. No.: 09/673,156

(22) PCT Filed: Mar. 17, 1999

(86) PCT No.: PCT/EP99/01734

§ 371 (c)(1),
(2), (4) Date: Nov. 14, 2000

(87) PCT Pub. No.: WO99/54362

PCT Pub. Date: Oct. 28, 1999

(30) Foreign Application Priority Data

Apr. 17, 1998 (DE) .......................... 198 16 886

(51) Int. Cl.$^7$ ................................................ C08F 2/04
(52) U.S. Cl. ........................... 526/64; 526/88; 526/328; 526/329.2; 422/131

(58) Field of Search .............................. 526/64, 88, 328, 526/329.2; 422/131

(56) References Cited

U.S. PATENT DOCUMENTS 5,886,112 A * 3/1999 Vuillemin et al. ............ 526/64

FOREIGN PATENT DOCUMENTS

| DE | 2940043 | 4/1981 |
| EP | 0749987 | 12/1996 |

* cited by examiner

Primary Examiner—Fred Teskin
(74) Attorney, Agent, or Firm—Connolly Bove Lodge & Hutz LLP

(57) ABSTRACT

Process and apparatus for the continuous preparation of polymers Two reaction partners (starting materials) are stored in separate reservoirs 2, 3, 4 and 5 and are transported using overpressure via heated heat exchangers 11, 12 into a micromixer 18 by means of control and metering devices 6, 7, which can be metering pumps. In the heat exchangers 11, 12, the starting materials are heated, separately in each case, to the extent that during the mixing operation in the micromixer 18 the required reaction temperature is immediately reached. The polymerization takes place in a downstream tube reactor 20 which consists of tubes 21, 22, 23 which are connected in series.

11 Claims, 3 Drawing Sheets

METHOD AND DEVICE FOR CONTINUOUS PRODUCTION OF POLYMERS

Process and apparatus for the continuous preparation of polymers

The invention relates to a process and an apparatus for the continuous preparation of polymers in which at least two reaction partners (starting materials) are conducted through a micromixer and combined and mixed with one another.

The reaction partners are, for example, one or more liquid or dissolved monomers and one or more initiators.

DE-A 19 41 266 discloses a process for carrying out chemical reactions between gaseous and/or liquid reaction partners, in which at least two reaction partners are divided into spatially separate microstreams by a multitude of microchannels assigned to each of them, which microstreams then exit into a shared mixing and reaction compartment. The microstreams exit, in the shape of fluid lamellae of the starting materials, from the microchannels into the mixing/reaction compartment at equal flow rates for each starting material. Each fluid lamella of a starting material is conducted into the mixing and reaction compartment immediately adjacent to a fluid lamella of another starting material, the adjacent fluid lamellae mixing with one another by diffusion and/or turbulence.

For the mixing, use is made of what is termed a microstructure lamella mixture having at least one mixing chamber and an upstream guide component for feeding the fluids to be mixed to the mixing chamber. The guide component can be composed of a plurality of plate-like elements which are layered one above the other and are pierced by channels which run at an incline or transversely to the longitudinal axis of the micromixer. The channels of adjacent elements cross without contact and open out into the mixing chamber. Another constructional possibility of a micromixer is a parallel arrangement of channels. The fluids to be mixed flow from opposite directions into the mixer and exit mixed and perpendicularly thereto into the mixing chamber. The mixer brings the reaction partners intimately into contact with one another, i.e. mixes them well with one another. As is implied by the cited document, the quality of the mixing and the effect of the mixing means on the yield of the desired product is greatly dependent on the ratio of the chemical reaction rates given by the reaction kinetics to the mixing rate. In the case of chemically slow reactions, these generally proceed considerably slower than the mixing. If the chemical reaction rates and the mixing rate are of the same order of magnitude, complex interactions occur between the reaction kinetics and the local, turbulence-specific mixing behavior in the reactor used and in the mixing means which is generally a micromixer. If the chemical reaction rates are considerably faster than the mixing rate, the reaction rates and the yields are essentially determined by the mixing, i.e. by the local time-dependent rate and concentration field of the reaction partners.

In the prior art, it is customary to use a number of mixing means or mixers to carry out fast reactions. In this case, a distinction is made between dynamic mixers, such as agitators, turbines or rotor-stator systems and static mixers such as Kenics mixers, SMV mixers and jet mixers.

In the field of solution polymerization of acrylate-based monomers, with or without additives, batch or semibatch technology is usually used, which cannot ensure uniform product quality, owing to the batchwise preparation of polymers. The changeover from the known batch or semibatch technology to a continuous production of solution polymers is accompanied by problems, to the extent that polymers of this type can become insoluble in the solvent at high molecular weights. In the case of a polymer defined as a solution addition polymer, it is a small, high-molecular-weight fraction of the polymer in the molar mass distribution. This high-molecular-weight fraction can, inter alia, be formed by an initially poor mixing of monomers and initiator, since a local deficiency of initiator can lead to the formation of macromolecules having a very high degree of polymerization, which are known to form, in the case of free-radical polymerization, within a time of less than one second. These high-molecular-weight fractions lead to a considerable broadening of the molar mass distribution up to the formation of bimodal molar mass distributions. This causes unwanted deposits to form in the reactor system. Precipitation of the insoluble molecules out of the solution is known to be favored by solid surfaces, such as reactor walls, internals, etc. In tube reactors, which are frequently equipped with static mixers to intensify the mixing operations and heat transfer, there is a high and thus unfavorable surface/volume ratio. This means that, in comparison with a stirred-tank batch reactor of comparable capacity, a higher probability of deposit formation in the reactor system must be assumed, which in the case of the continuously operated tube reactor can lead to a blockage of the system and excludes long-term operation. The generally low amounts of polymer having high molar masses in the product mixture can be sufficient to block a tube reactor, since the process is operated over very long periods. If in the case of the tube reactor there is, at the start of the reactor during metering, a poor homogenization of the reaction mixture over a system-dependent mixing section, intensive deposit formation can occur, particularly in this area.

With the acrylate-based monomers, these can be, for example, copolymers, as are described in DE-A 40 27 594. These addition copolymers are potentially based on alkyl esters and functionalized alkyl esters of $\alpha,\beta$-ethylenically unsaturated carboxylic acids with or without copolymerizable vinyl monomers. A further monomer is, for example, styrene.

EP 0 749 987 A1 discloses a process for continuous anionic polymerization. In this case the monomer system consists of at least one (meth)acrylic acid monomer. The initiator consists of organometallics, as are used for the anionic polymerization. As reactions of this type are very fast reactions which lead to complete conversion within 0.2 to 0.3 seconds, an adiabatic tube reactor having an upstream micromixer was developed for a continuous reaction procedure. The micromixer is a turbulently mixing tangential flow mixer. The residence time in the mixer is approximately 0.05 seconds. The starting materials (monomers, solvent and initiator) are, before being fed into the mixer, cooled to from −14 to −40° C. to prevent the reaction from starting in the mixer. The reaction occurs in the tube reactor. Owing to the adiabatic reaction procedure, depending on the monomer-initiator system, a final temperature of from 44° C. to 91° C. is achieved.

Starting from the above-described prior art, the object of the invention is to provide a process and an apparatus for continuous production of free-radical solution polymers, in which blockage or plugging of the reactor system is substantially avoided and the apparatus can be operated for relatively long periods without interruption.

This object is achieved according to the invention by a process of the type described at the outset in such a manner that the starting materials are, prior to their entry into the micromixer, preheated to the extent that they reach a required reaction temperature after entry into the micromixer, in which they are mixed by diffusion and/or turbulence in such a manner that formation of bimodal molar mass distributions or high-molecular-weight fractions is suppressed and that a polymerization of the monomeric reaction partners takes place in a tube reactor downstream of the micromixer. For this purpose it is necessary that mixing takes place immediately, i.e. that the mixing time is less than the reaction time to form an individual polymer chain. Preferred mixing times are, depending on reaction time, in the range from one second to instantaneous mixing. Typical reaction times are familiar to those skilled in the art and are, depending on reaction type and temperature, in the range from milliseconds to a few seconds. As a result of the preheating, the required reaction temperature can be achieved immediately after entry into the micromixer.

Particular embodiments of the process according to the invention are disclosed in the subclaims.

In a development of the process, the one starting material of acrylate-based monomers having a styrene addition and a solvent is passed through a first heated heat exchanger. Optionally, the one starting material of acrylate-based monomers, but without styrene addition, and with a solvent, flows through a first heated heat exchanger.

In addition, the other starting material of a free-radical initiator and, if appropriate, a solvent is passed through a second heated heat exchanger.

In carrying out the process, the starting material of monomers/solvent and the starting material of initiator/solvent is fed into the micromixer in a mixing ratio of from 1:1 to 10:1, in particular 9:1.

The apparatus for the continuous preparation of polymers, having reservoirs for the reaction partners, metering and control devices, filters, and with or without premixers, features a heated heat exchanger being connected in each case downstream of both the reservoirs for the starting material of monomers and if appropriate solvent and the reservoirs for the starting material of initiator and if appropriate solvent, each of the two heat exchangers being connected via lines to the micromixer and the micromixer being connected to a tube reactor which is connected to a discharge vessel for the solution polymers.

The further development of the apparatus according to the invention can be taken from the features of patent claims 8 to 10.

The process according to the invention (including its embodiments) is distinguished from the known process of EP 0 749 987 A1 by the fact that the known process relates to anionic polymerizations, whereas the process according to the invention relates to free-radical polymerizations. Thus different initiator systems are used. The known process is based in addition on an adiabatic temperature regime of the tube reactor. The novel process can comprise a controlled temperature regime having defined settable temperatures, which is expedient for the reaction procedure of the free-radical polymerization. In the known process, the starting materials are fed to the micromixer at from –13° C. to –40° C. Heating is carried out by the heat of reaction formed in the subsequent polymerization. In the novel process, the starting material streams are preheated in such a manner that after the mixing, preferably immediately after entry, a starting temperature of, for example, 120° C. (depending on the reaction type) is present in the micromixer. Excess heat of reaction which would lead to heating of the reaction mixture can be removed from the system by conventional cooling systems. Owing to the differing starting temperatures in the known process and in the novel process according to the invention, in the known process, the reaction takes place exclusively in the tube reactor which is connected downstream of the micromixer. In the novel process, the reaction can take place as early as in the micromixer. In the known process, the micromixer is described by a tangential-flow mixer which mixes exclusively by turbulence. In the novel process, micromixers which have a lamella structure and mix by diffusion and/or turbulence are preferred.

In the invention, to improve mixing, a micromixer is used. In this, the two starting material streams to be mixed are combined via very fine lamella channels in such a manner that mixing of the starting materials in the micro range is present as early as the meeting of the streams. Owing to the construction, in such a micromixer, extremely small channels are present which lead to an extremely high surface/volume ratio, as a result of which the probability of deposit formation in the mixing system and thus the probability of blockage of the mixer should increase greatly. However, surprisingly, owing to the very good mixing of the starting materials, the formation of a high-molecular-weight fraction can be avoided, so that no insoluble high-molecular-weight fractions are formed in the molar mass distribution and despite the extremely high surface/volume ratio, no deposit formation occurs in the reactor system.

BRIEF DESCRIPTION OF THE DRAWINGS

The invention is described in more detail below with reference to the drawings. In the drawings:

FIG. 1 shows the flow chart of an apparatus 1 or of a plant for preparing solution polymers. The starting materials are a monomer/solvent mixture which is stored in reservoirs 2 and 3 and an initiator/solvent mixture which is contained in reservoirs 4 and 5. The reservoir 2 contains an agitator mixer whose agitator is rotated by a motor M. The reservoir 2 is connected via a metering and control device 6 to the reservoir 3 which can, just like the reservoir 4, be charged with nitrogen, for example, in a manner which is not shown. The monomers/solvent mixture flows from the reservoir 3 via a line, in which is installed a filter 8 which filters out any impurities from the mixture, into a heated heat exchanger 11 and from this via a heated line 27 and a filter 17 into a micromixer 18. The micromixer 18 is one of the commercially available micromixers of a variety of designs.

Figure 1:
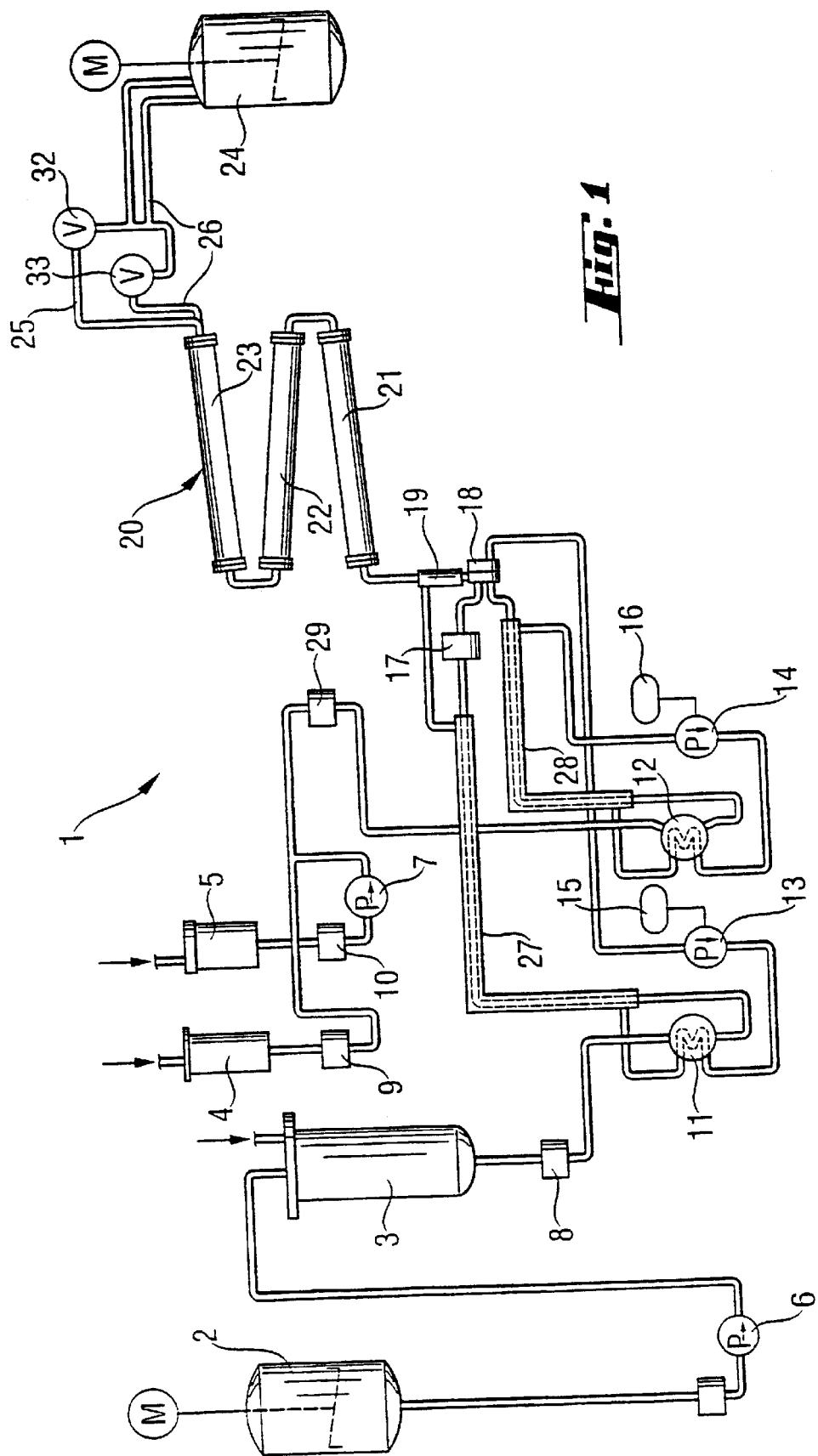
FIG. 1 shows a flow chart for an apparatus for carrying out chemical reactions according to the invention.

From the reservoir 4, the initiator/solvent mixture is passed via filters 9 and 29 through a heated heat exchanger 12. The other reservoir 5 for the initiator/solvent mixture is connected via a filter 10 and a metering and control device 7 to the line in which the filters 9 and 29 are arranged. The heat exchanger 12 is likewise connected to the micromixer 18 via a heated line 28. For the heating medium for heating the line 27, a closed circuit is provided in which the heating medium is taken off at the outlet of the line 27 and returned to the start of the line 27 via a premixer 19, the micromixer 18 and a metering and control device 13. A heating device 15 in this case heats the heating medium flowing through the closed circuit. In a similar manner, the line 28 is heated, in that the heating medium at the end of the line 28 is returned to the start of the line 28 via a metering and control device 14. The heating medium in this closed circuit is heated by a heating device 16. The heat exchangers 11, 12 are preheated to a temperature from below the reaction temperature to the reaction temperature. For example, this temperature is in the range from 50 to 180° C.

Figure 2:
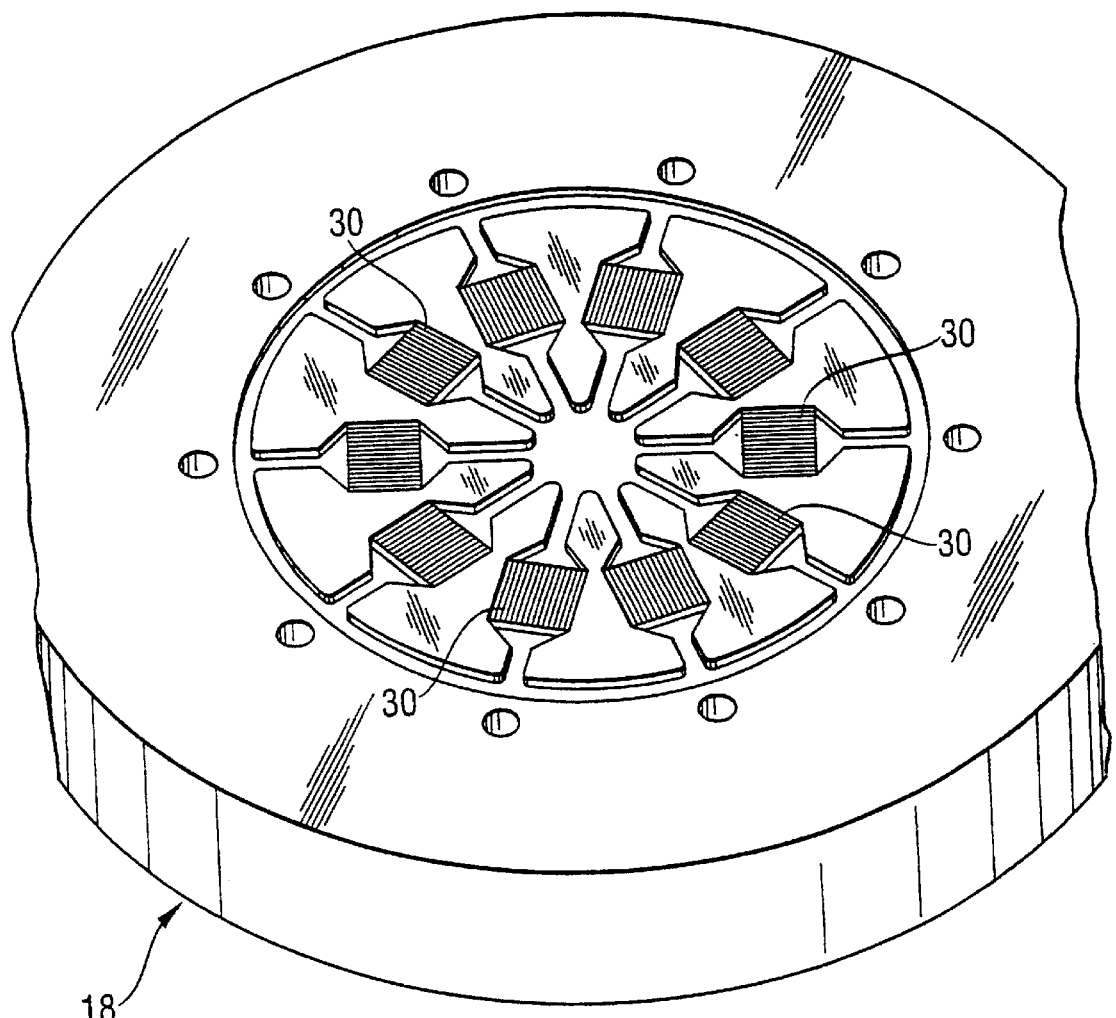
FIG. 2 shows a plan view as an example of a micromixer used in the apparatus according to the invention.
Figure 3:
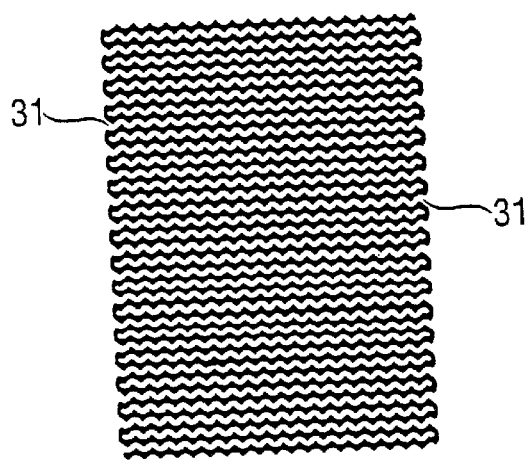
FIG. 3 shows a plan view of a mixer unit of the micromixer having a number of channels on each feed side.

Downstream of the micromixer 18, which will be further described in more detail with reference to FIGS. 2 and 3, is connected the premixer 19, but the premixer can alternatively be omitted if appropriate. Thereto is connected a tube reactor 20 which consists, for example, of three separately heatable tubes 21, 22 and 23, of which, for example, each has a length of 1 m. The heated tubes 21, 22, 23 are completely packed with mixers, Kenics mixers, for example, being situated in tubes 21 and 22 and sulzer SMX mixers being situated in tube 23. The tubes 21, 22, 23 are preferably fitted with static mixers, but it is likewise possible to have the tubes operate without mixers. The tubes 21 and 22 have, for example, a nominal diameter of 10 mm, while the tube 23 has a nominal diameter of 20 mm. The nominal diameters of the tubes of the tube reactor 20 can be chosen freely and are determined by the desired throughput of solution polymers. Likewise, as premixer 19, for example, a Sulzer SMX mixer is provided which can have a nominal diameter of 5 mm. At the tube diameters specified, the total volume of the three tubes 21, 22 and 23 of the tube reactor 20 is approximately 0.51.

Instead of the tube reactor 20 there is also the possibility that other reactors are used in the post-reaction section, which reactors contain, for example, heated mixers.

The monomers/solvent mixture and the initiator/solvent mixture are fed into the micromixer in a defined mixing ratio of from 1:1 to 10:1, in particular 9:1. These two reaction partners, also termed starting materials, are passed through the micromixer and combined in a mixing and reaction compartment of the micromixer. The two starting materials are heated by the upstream heated heat exchangers 11 and 12 to the extent that during the mixing operation in the micromixer 18 the required reaction temperature of, for example, from 60 to 180° C. is reached immediately. The reaction temperature depends on the respective reaction partners and is not restricted to the abovementioned range. The polymerization of the two reaction partners takes place in the downstream tube reactor 20. The molar masses, the conversion rate and the viscosity for an above-described monomer mixture are set via the respective initiator or its concentration and via the heating of the tube reactor section and the residence time of the reaction partners in the tube reactor 20.

The one reaction partner is, for example, a starting material of acrylate-based monomers, with or without a styrene addition, and a solvent. The other reaction partner consists of one or more free-radical initiators and a solvent.

The tube reactor 20 is connected via discharge lines 25 and 26 to a discharge vessel 24 for the solution polymers. In each of the discharge lines 25, 26 is arranged a control valve 32, 33 by means of which the operating pressure in the tube reactor 20 can be controlled. Using the control valves 32, 33, the operating pressure in the reactor section downstream of the tube reactor 20 is controlled, for example, in the range from $2 \times 10^5$ Pa to $5 \times 10^6$ Pa to prevent boiling of the reaction mixture in the tube reactor. The discharge lines 25 and 26 are cooled. The discharge vessel 24 is a stirred tank whose agitator is rotated by a motor M.

FIG. 2 shows a perspective plan view of a micromixer 18, which is a static micromixer which is known per se. The micromixer 18 comprises a micromixer arrangement having a number of mixing units 30 which are arranged in a star shape. The number of channels 31, cf. FIG. 3, per mixing unit is from 2×16 to 2×18. In the micromixer 18, the reaction partners or starting materials to be mixed with one another are combined via the lamella channels 31 in such a manner that on exit of the reaction streams the starting materials mix in the micro range. Although the channels in the micromixer 18 have an extremely high surface/volume ratio, which customarily greatly increases the probability of deposit formation in the mixer system and therefore the probability of blockage of the micromixer 18, the very good mixing of the starting materials substantially avoids the formation of a high-molecular-weight fraction in the molar mass distribution. Thus, despite the extremely high surface/volume ratio, no deposit formation occurs. This is further described in detail with reference to FIGS. 4a and 4b.

Obviously, a micromixer of a different configuration which is commercially available can also be used.

Figure 4A:
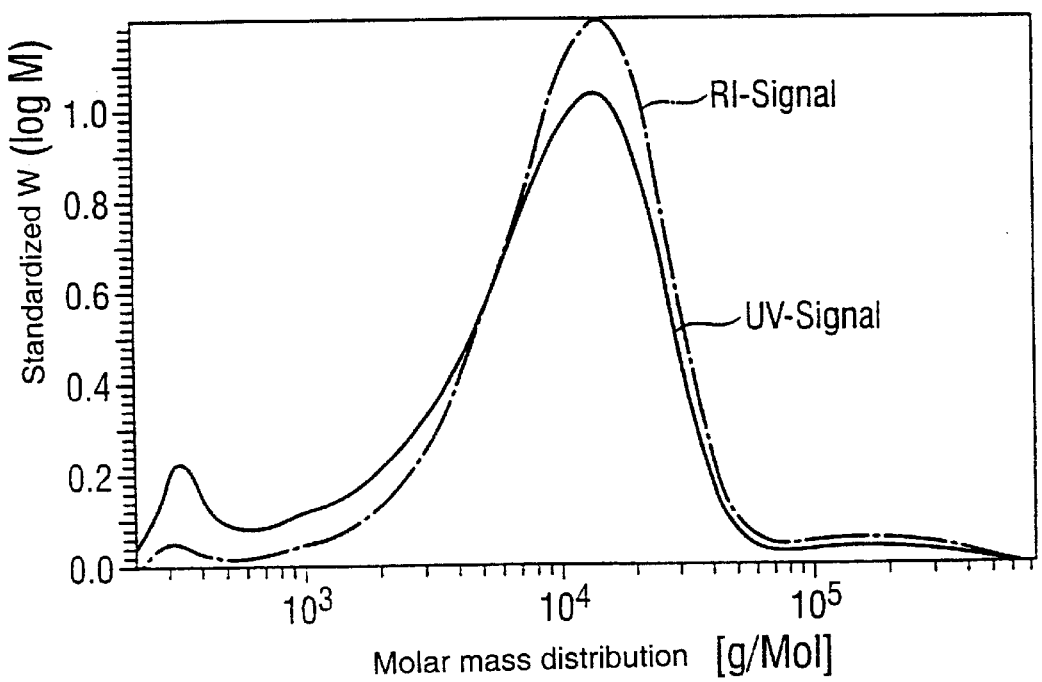
FIGS. 4a and 4b show the molar mass distribution of solution polymers which were prepared without the use and with the use, respectively, of a micromixer.
Figure 4B:
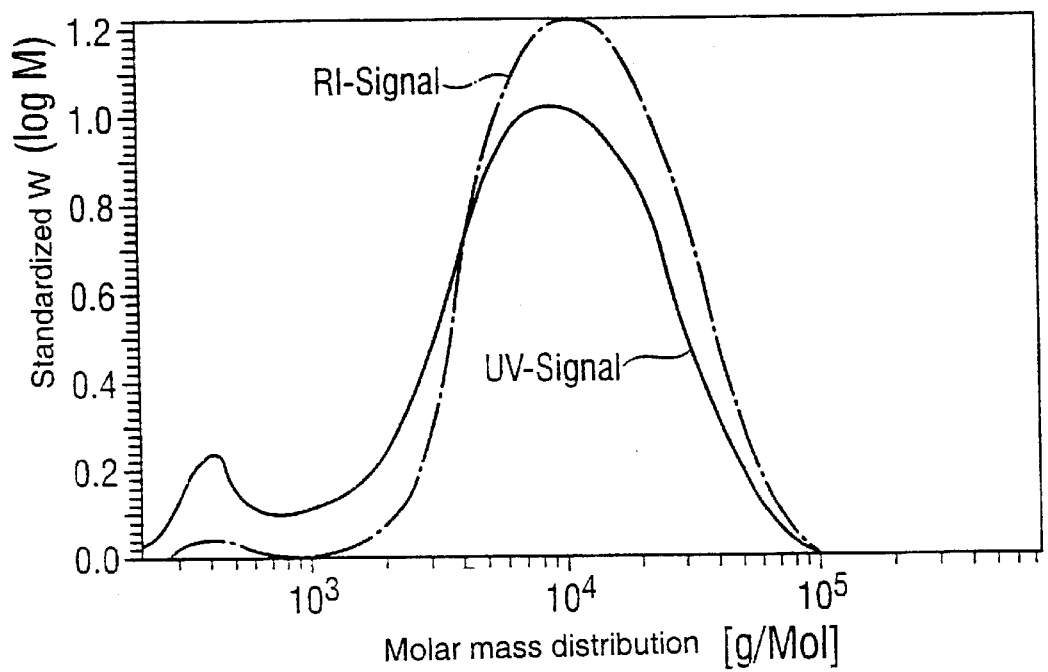

In the two FIGS. 4a and 4b, the molar mass distributions recorded by gel permeation chromatography are shown, of which samples were taken downstream of the tube reactor 20 and from the discharge vessel 24. The graphs represent the standardized frequency W(log M) over the molar masses of the solution polymers. The solvent for the monomers and the initiator was tetrahydrofuran in each case, the polymer concentration in the solvent being between 5.61 and 5.64 g/l. The UV signal curve is shown with a continuous line, while the RI signal curve is shown dot-dashed, RI being the refractometer index or refractive index.

In FIG. 4a, which relates to solution polymers which were prepared without using the micromixer 18, it can clearly be seen that a high-molecular-weight fraction is present at a molar mass>$10^5$ g/mol. A comparison with the solution polymers as in FIG. 4b which were prepared using the micromixer 18 shows that a high-molecular-weight fraction having a molar mass>$10^5$ g/mol is not present in the solution polymers, so that, despite the high surface/volume ratio, in the micromixer, just as in the downstream tube reactor 20, virtually no deposit formation occurs.

The reaction is generally carried out in such a manner that, in the polymers, distribution widths $M_n/M_w$ according to an ideally mixed free-radical polymerization are established, having the number average $M_n$ and the weight average $M_w$ of the molar mass distribution.

What is claimed is:

1. A process for the continuous preparation of polymers by free-radical polymerization in which at least two staring materials, one of monomers/solvent and another of initiator/solvent are conducted through a micromixer and combined and mixed with one another, which comprises the starting materials, prior to their entry into the micromixer (18), being preheated to the extent that they reach a required reaction temperature after entry into the micromixer (18), in which they are mixed with one another by diffusion and/or turbulence in such a manner that formation of bimodal molar mass distributions or insoluble high-molecular-weight fractions is suppressed and that a polymerization of monomers takes place in a tube reactor (20) downstream of the micromixer.

2. The process as claimed in claim 1, wherein the reaction is carried out in such a manner that, in the polymers, distribution widths $M_n/M_w$ according to an ideally mixed free-radical polymerization are established, having the number average $M_n$ and the weight average $M_w$ of the molar mass distribution.

3. The process as claimed in claim 1 or 2, wherein the starting material of monomers/solvent comprises acrylate-based monomers having a styrene addition and a solvent, and wherein the starting material of monomers/solvent flows through a first heated heat exchanger (11).

4. The process as claimed in claim 1 or 2, wherein the starting material of monomers/solvent comprises acrylate-based monomers without styrene addition and with a solvent, and wherein the starting material of monomers/solvent flows through a first heated heat exchanger (11).

5. The process as claimed in claim 1 or 2, wherein the starting material of initiator/solvent comprises a free-radical initiator and a solvent, and wherein the starting material of initiator/solvent is passed through a second heated heat exchanger (12).

6. The process as claimed in claim 1 or 2, wherein the starting material of monomers/solvent and the starting material of initiator/solvent is fed into the micromixer in a mixing ratio of from 1:1 to 10:1.

7. An apparatus for the continuous preparation of polymers in accordance with a process as claimed in claim 1 or 2, having reservoirs (2, 3; 4, 5) for the starting materials, metering and control devices (6, 7), filte (8-10, 17 29), and with or without premixer (19), wherein a heated heat exchanger (11; 12) is connected in each case downstream of both the reservoirs (2, 3) for the starting material of monomer/solvent and the reservoirs (4, 5) for the starting material of initiator /solvent, wherein each of the two heat exchangers is connected via lines (27, 28) to the micromixer (18) and wherein the micromixer (18) is connected to a tube reactor (20) which is connected to a discharge vessel (24) for the solution polymers.

8. The apparatus as claimed in claim 7, wherein the micromixer (18) is connected to the tube reactor (20) via a premixer (19).

9. The apparatus as claimed in claim 7, wherein the heat exchangers (11; 12) are preheated to a temperature from below the reaction temperature to the reaction temperature.

10. The apparatus as claimed in claim 7, wherein the micromixer (18) consists of a micromixer arrangement having a number of mixing units (30) which are arranged in a star shape and wherein the number of the channels (31) per mixing unit is from 2×16 to 2×18.

11. The process as claimed in claim 1 or 2, wherein the starting material of monomers/solvent and the starting material of initiator/solvent is fed into the micromixer in a mixing ratio of from 1:1 to 9:1.

* * * * *

UNITED STATES PATENT AND TRADEMARK OFFICE
CERTIFICATE OF CORRECTION

PATENT NO.     : 6,555,629 B1
DATED          : April 29, 2003
INVENTOR(S)    : Detlev Pysall et al.

It is certified that error appears in the above-identified patent and that said Letters Patent is hereby corrected as shown below:

Column 6,
Line 46, delete "staring" and insert -- starting --.

Column 7,
Line 20, delete "filte" and insert -- filters --.

Signed and Sealed this

First Day of July, 2003

JAMES E. ROGAN
*Director of the United States Patent and Trademark Office*